(12) United States Patent
Kang et al.

(10) Patent No.: US 9,223,725 B2
(45) Date of Patent: Dec. 29, 2015

(54) METHOD AND APPARATUS FOR SELECTIVELY READING IMAGE DATA

(71) Applicant: Samsung Electronics Co., Ltd., Suwon-si, Gyeonggi-do (KR)

(72) Inventors: Eun Ji Kang, Yongin-si (KR); Kyoung Man Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/197,457

(22) Filed: Mar. 5, 2014

(65) Prior Publication Data

US 2014/0258664 A1    Sep. 11, 2014

(30) Foreign Application Priority Data

Mar. 5, 2013    (KR) .................. 10-2013-0023447

(51) Int. Cl.
  *G06F 3/00* (2006.01)
  *G06F 3/048* (2013.01)
  *G06F 12/14* (2006.01)
  *G06F 12/06* (2006.01)
  *G06T 1/60* (2006.01)

(52) U.S. Cl.
  CPC ............ *G06F 12/1425* (2013.01); *G06F 12/06* (2013.01); *G06T 1/60* (2013.01)

(58) Field of Classification Search
  None
  See application file for complete search history.

(56) References Cited

U.S. PATENT DOCUMENTS

| | | | |
|---|---|---|---|
| 4,806,919 A * | 2/1989 | Nakayama et al. | 715/790 |
| 5,877,762 A * | 3/1999 | Young | 715/803 |
| 6,108,722 A | 8/2000 | Troeller et al. | |
| 6,369,830 B1 * | 4/2002 | Brunner et al. | 345/629 |
| 6,803,895 B2 | 10/2004 | Knapp et al. | |
| 7,133,013 B2 | 11/2006 | Kamezaki et al. | |
| 7,333,096 B2 | 2/2008 | Washio et al. | |
| 7,495,669 B2 | 2/2009 | Ushida et al. | |
| 2003/0193512 A1 * | 10/2003 | Komagata | 345/629 |
| 2006/0026530 A1 | 2/2006 | Shepherd et al. | |
| 2006/0050992 A1 | 3/2006 | Aoki et al. | |
| 2009/0003714 A1 * | 1/2009 | Subramaniam | 382/232 |
| 2011/0012890 A1 | 1/2011 | Kim et al. | |
| 2013/0031346 A1 * | 1/2013 | Sakarda | 713/2 |

FOREIGN PATENT DOCUMENTS

| | | |
|---|---|---|
| JP | 05-158866 | 6/1993 |
| JP | 2004-032353 | 1/2004 |
| JP | 2007-249564 | 9/2007 |

* cited by examiner

*Primary Examiner* — Zachary K Huson
*Assistant Examiner* — David E Martinez
(74) *Attorney, Agent, or Firm* — EIPG, PLLC

(57) ABSTRACT

A method of reading data includes setting first addresses defining a full image and second addresses defining a blocking region included in the full image and not reading blocking region data corresponding to the blocking region among image data corresponding to the full image using the first addresses and the second addresses.

13 Claims, 10 Drawing Sheets

METHOD AND APPARATUS FOR SELECTIVELY READING IMAGE DATA

CROSS-REFERENCE TO RELATED APPLICATIONS

This application claims the benefit of priority under 35 U.S.C. §119(a) from Korean Patent Application No. 10-2013-0023447 filed on Mar. 5, 2013, the disclosure of which is hereby incorporated by reference in its entirety.

BACKGROUND

1. Field

Embodiments of the general inventive concept relate to a method of reading data, and more particularly, to a method and apparatuses which bypass, or prevent, or not perform reading block region data corresponding to a blocking region included in a full image among image data corresponding to the full image.

2. Description of the Related Art

With the increase of the resolution of a display in a portable device such as a smart phone or a tablet personal computer (PC), the bandwidth of image data also increases so that a high-resolution image can be displayed. The portable device needs to read the entire image data of the image, even when displaying an image with an excerpted blocking region. Reading the entire image data results in a waste of bandwidth and excessive power consumption.

SUMMARY

The present general inventive circuit provides methods and apparatus to read data and/or bypass, or prevent reading data, or not perform reading data in an electronic apparatus or semiconductor device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of reading data, the method including setting first addresses defining a full image and second addresses defining a blocking region included in the full image and bypassing reading blocking region data corresponding to the blocking region among image data corresponding to the full image.

The bypassing reading the blocking region may further comprise, when a current address sequentially increasing line by line is a line start address of the blocking region, not reading the blocking region data until the current address becomes an address subsequent to a line end address of the blocking region.

The bypassing reading the blocking region may further comprise, when a current address sequentially increasing line by line is a line start address of the blocking region, making a jump in the current address to an address subsequent to a line end address of the blocking region.

The setting of the first and second addresses may be performed using a special function register.

The foregoing and/or other features and utilities of the present general inventive concept may also be achieved by providing a system on chip including a special function register configured to store first addresses defining a full image and second addresses defining a blocking region included in the full image and a data processing circuit configured to bypass reading blocking region data corresponding to the blocking region when reading image data corresponding to the full image.

The data processing circuit may include an address generation circuit configured to generate full addresses corresponding to the image data using the first addresses; and a data read circuit configured to compute a line start address and a line end address of the blocking region in each line using the second addresses and, when a current address increasing sequentially is the line start address among the full addresses, bypass reading the blocking region data until the current address becomes an address subsequent to the line end address.

The data processing circuit may include an address generation circuit configured to generate full addresses corresponding to the image data using the first addresses; and a data read circuit configured to compute a line start address and a line end address of the blocking region in each line using the second addresses and, when a current address increasing sequentially is the line start address among the full addresses, make a jump in the current address to an address subsequent to the line end address.

The foregoing and/or other features and utilities of the present general inventive concept may also be achieved by providing an application processor including the above-described system on chip.

The data processing circuit may include an address generation circuit configured to generate full addresses corresponding to the image data using the first addresses; and a data read circuit configured to compute a line start address and a line end address of the blocking region in each line using the second addresses and, when a current address increasing sequentially is the line start address among the full addresses, bypass reading the blocking region data until the current address becomes an address subsequent to the line end address.

Alternatively, the data processing circuit may include an address generation circuit configured to generate full addresses corresponding to the image data using the first addresses; and a data read circuit configured to compute a line start address and a line end address of the blocking region in each line using the second addresses and, when a current address increasing sequentially is the line start address among the full addresses, make a jump in the current address to an address subsequent to the line end address.

The foregoing and/or other features and utilities of the present general inventive concept may also be achieved by providing a mobile apparatus including a memory configured to store a full image and the above-described system on chip.

When a current address sequentially increasing line by line is a line start address of the blocking region, the system on chip may bypass reading the blocking region data until the current address becomes an address subsequent to a line end address of the blocking region.

When a current address sequentially increasing line by line is a line start address of the blocking region, the system on chip may make a jump in the current address to an address subsequent to a line end address of the blocking region.

The mobile apparatus may further include a non-volatile memory configured to store an application and a central processing unit configured to execute the application. The application may control the number of blocking regions and the second addresses.

The foregoing and/or other features and utilities of the present general inventive concept may also be achieved by providing a method of reading data from a memory device, comprising storing in a first register location first start/end addresses corresponding to an image in the data, storing in a second register location second start/end addresses corresponding to one or more regions included in the image, and executing a read operation to read image data from the memory device based on the first start/end addresses exclusive of the one or more regions based on the second start/end addresses.

Executing the read operation may comprise executing the read operation at a sequentially advancing read address, stopping the read operation when the read address is a start address of the one or more regions, and resuming the read operation when the read address has advanced to an end address of the one or more regions.

Executing the read operation may comprise executing the read operation at a sequentially advancing read address, skipping to a next address subsequent to the end address of the one or more regions when the read address is the start address of the one or more regions.

The foregoing and/or other features and utilities of the present general inventive concept may also be achieved by providing a program storage medium storing an application for causing a data processor to perform the steps of receiving line addresses which define regions in image data, reading image data at a sequentially advancing read address, bypassing image data which falls within the regions, and outputting remaining image data exclusive of the regions.

The foregoing and/or other features and utilities of the present general inventive concept may also be achieved by providing an image data processor, comprising a register configured to store first start/end addresses corresponding to an image in stored data and second start/end addresses corresponding to one or more regions included in the image, and a data processing circuit configured to read image data of the image based on the first start/end addresses exclusive of the one or more regions based on the second start/end addresses.

The data processing circuit may comprises an address generation circuit configured to generate addresses corresponding to the image based on the first start/end addresses, a data read circuit configured to selectively read image data from among the generated addresses exclusive of data within the one or more regions based on the second start/end addresses.

BRIEF DESCRIPTION OF THE DRAWINGS

These and/or other aspects and advantages of the present inventive concepts will become apparent and more readily appreciated from the following description of the embodiments, taken in conjunction with the accompanying drawings of which.

DETAILED DESCRIPTION OF THE EMBODIMENTS

Figure 1:
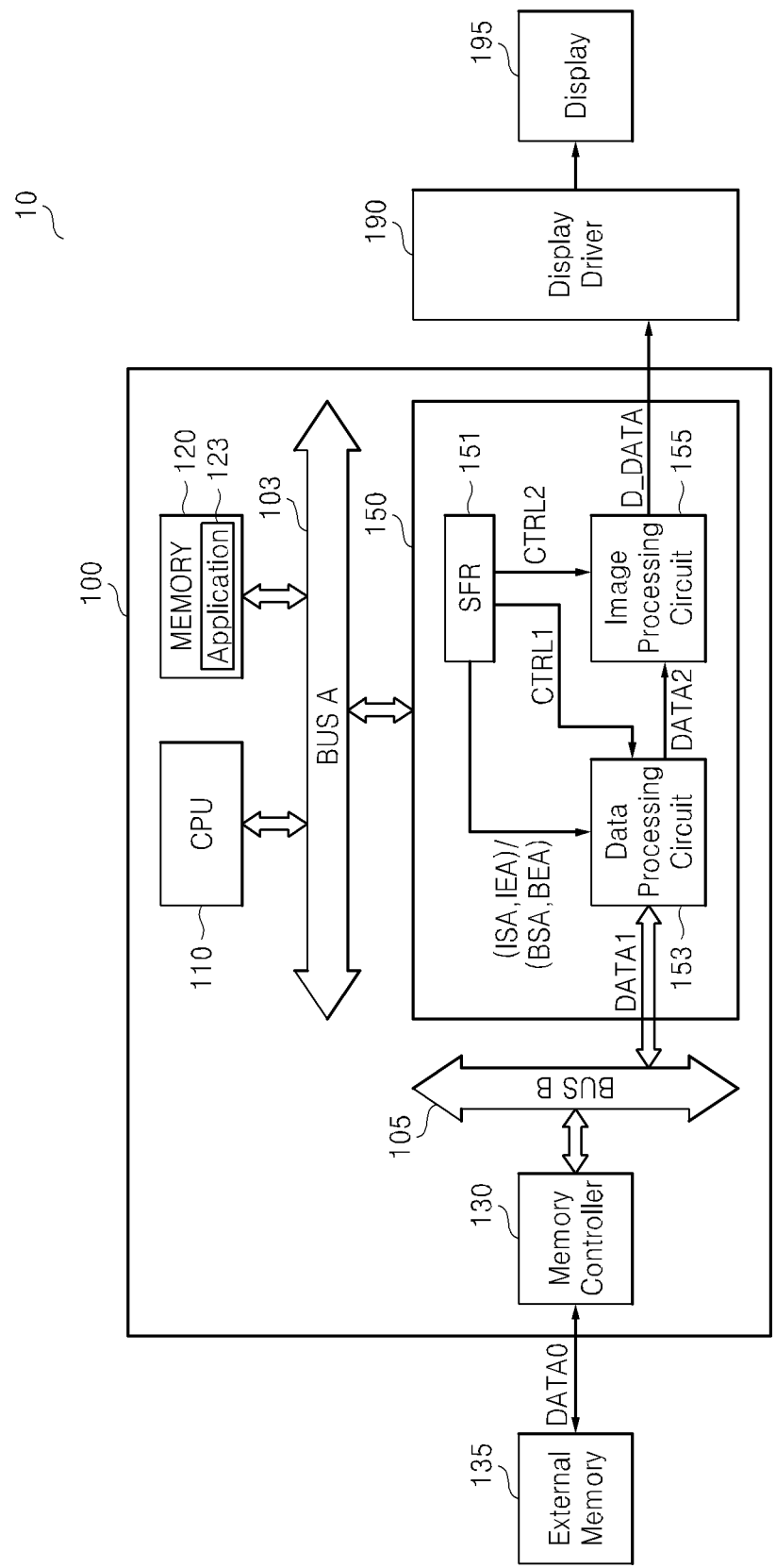
FIG. 1 is a block diagram of an image data processing system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. This general inventive concept may, however, be embodied in many different forms and should not be construed as limited to the embodiments set forth herein. Rather, these embodiments are provided so that this disclosure will be thorough and complete, and will fully convey the scope of the general inventive concept to those skilled in the art. In the drawings, the size and relative sizes of layers and regions may be exaggerated for clarity.

The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of this disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image data processing system 10 according to some embodiments of the inventive concept. Referring to FIG. 1, the image data processing system 10 may include an image data processor 100, an external memory 135, a display driver 190, and a display 195.

The image data processing system 10 may be implemented, for example, as a personal computer (PC), a portable electronic system (or a mobile device), or an electronic system including the display 195 that can display image data.

The portable electronic system may be, for example, a laptop computer, a mobile telephone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), or an e-book reader.

The image data processor 100 may control the external memory 135 and/or the display driver 190. In other words, the image data processor 100 may control the overall operation of the image data processing system 10. The image data processor 100 may process data DATA0 output from the external memory 135 and transmit processed data D_DATA to the display 195 through the display driver 190.

Figure 2:
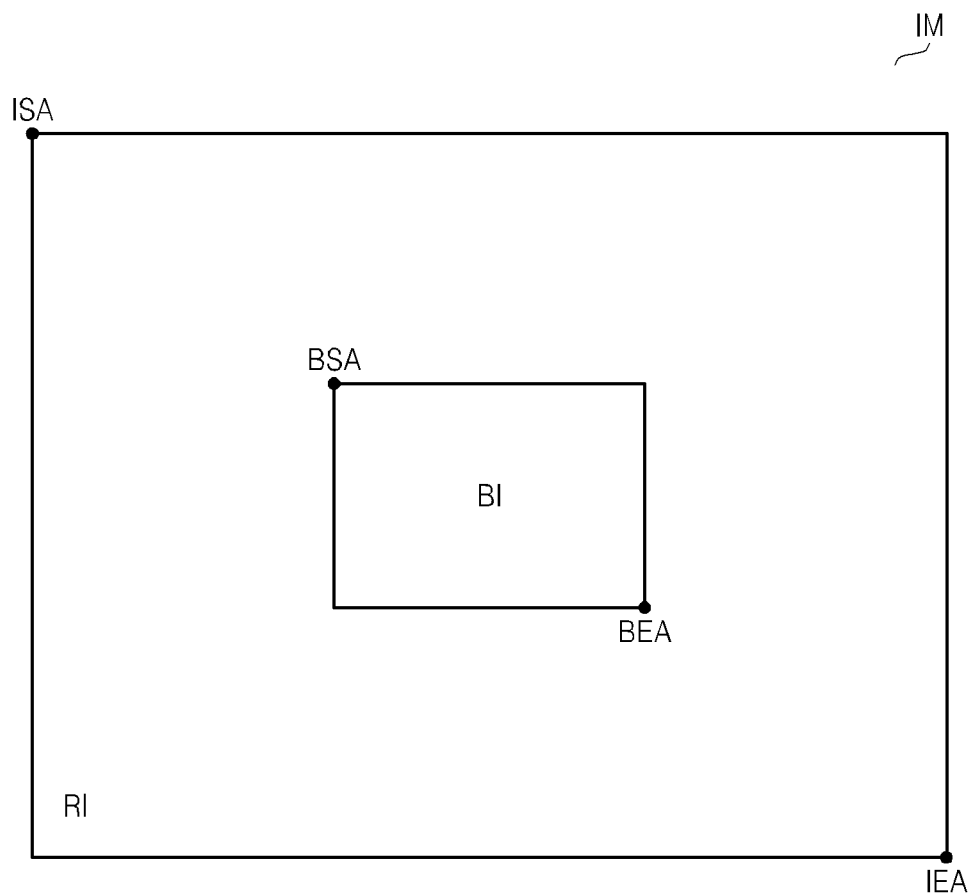
FIG. 2 is a schematic diagram of a full image including a blocking region according to an exemplary embodiment of the present general inventive concept.

FIG. 2 is a schematic diagram of a full image IM including a blocking region BI. Referring to FIGS. 1 and 2, the full image IM may include the blocking region BI. Although only one rectangular blocking region BI is included in the full image IM in FIG. 2, the scope of the inventive concept is not restricted by the number or shape of blocking regions.

The full image IM may be, for example, a still image, a moving image, a three-dimensional (3D) image, or a stereoscopic 3D image. The full image IM may be defined by first addresses ISA and IEA. The first addresses ISA and IEA may be the start address ISA and the end address IEA of image data corresponding to the full image IM, respectively.

The blocking region BI may be defined by second addresses, for example, BSA and BEA. The second addresses BSA and BEA may be the start address BSA and the end address BEA of blocking region data corresponding to the blocking region BI, respectively.

The image data processor 100 may set the first addresses ISA and IEA and the second addresses BSA and BEA and may bypass, prevent, or not perform reading the block region data, which corresponds to the blocking region BI among the image data corresponding to the full image IM, from a memory device, e.g., the external memory 135, using the first addresses ISA and IEA and the second addresses BSA and BEA.

In other words, the image data processor 100 may read only data DATA2 corresponding to a remaining image RI after excluding the blocking region BI from the full image IM, process the data DATA2, and transmit the processed data D_DATA to the display 195. Accordingly, the remaining image RI excluding the block region BI may be displayed on the display 195.

The image data processor 100 may be implemented in a printed circuit board (PCB) such as a motherboard, an integrated circuit (IC), or a system on chip (SoC). The image data processor 100 may be an application processor. The image data processor 100 may include a central processing unit (CPU) 110, a memory 120, a memory controller 130, and a display controller 150.

The CPU 110 may control the overall operation of the image data processor 100. For instance, the CPU 110 may control the operation of each of the elements 120, 130, and 150.

The CPU 110, the memory 120, and the display controller 150 are connected with one another through a first bus 103 and the memory controller 130 and the display controller 150 are connected with each other through a second bus 105. However, the present general inventive concept is not limited thereto. It is possible that the elements 110, 120, 130, and 150 may be connected to one another through a single bus in other embodiments.

The CPU 110 may execute an application 123 stored in the memory 120. The CPU 110 may control or set the first addresses ISA and IEA and the second addresses BSA and BEA through a special function register (SFR) 151 included in the display controller 150. The CPU 110 may be implemented, for example, by a single-core or a multi-core processor. The multi-core processor is a single computing component with two or more independent cores.

The memory 120 may store the application 123. The memory 120 may be implemented by a volatile or non-volatile memory. The volatile memory may be, for example, dynamic random access memory (DRAM), static RAM (SRAM), thyristor RAM (T-RAM), zero capacitor RAM (Z-RAM), or twin transistor RAM (TTRAM).

The non-volatile memory may be, for example, electrically erasable programmable read-only memory (EEPROM), flash memory, magnetic RAM (MRAM), spin-transfer torque MRAM, conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, molecular electronic memory device, or insulator resistance change memory.

The application 123 is executed according to the control of the CPU 110. The application 123 may control the number of blocking regions BI included in the full image IM and the second addresses BSA and BEA.

According to the control of the display controller 150, the memory controller 130 may transmit data stored in the external memory 135 to peripheral devices, e.g., the display controller 150. According to the control of the display controller 150, the memory controller 130 may not transmit to the display controller 150 the blocking region data corresponding to the blocking region BI in the full image IM among the image data corresponding to the full image IM stored in the external memory 135.

In other words, the memory controller 130 may be controlled by the display controller 150 to transmit only the data DATA2 corresponding to the remaining image RI to the display controller 150.

Since the CPU 110 may not be involved in the data transmission from the external memory 135 to the peripheral devices such as the display controller 150, the overall data transmission performance of the image data processing system 10 can be increased.

The external memory 135 may store the image data corresponding to the full image IM. The external memory 135 may be implemented, for example, by a hard disk drive (HDD) or a solid state drive (SSD). Like the memory 120, the external memory 135 may be a volatile or non-volatile memory.

The non-volatile memory may be implemented as, for example, a flash-based memory device such as a secure digital (SD) card, a multimedia card (MMC), an embedded MMC (eMMC), a universal serial bus (USB) flash drive, or a universal flash storage (UFS).

The display controller 150 may not read the blocking region data corresponding to the blocking region BI among the image data corresponding to the full image IM from the external memory 135 using the first addresses ISA and IEA and the second addresses BSA and BEA.

In other words, the display controller 150 may read only the data DATA2 corresponding to the remaining image RI excluding the blocking region BI in the full image IM, process the data DATA2, and transmit the processed data D_DATA to the display driver 190. The display controller 150 may include the SFR 151, a data processing circuit 153, and an image processing circuit 155.

The SFR 151 may store the first addresses ISA and IEA and the second addresses BSA and BEA. The first addresses ISA and IEA and the second addresses BSA and BEA may be externally set or programmed. They may be set or programmed by the CPU 110 or the application 123. The SFR 151 may output control signals CTRL1 and CTRL2 according to the control of the CPU 110.

The data processing circuit 153 may not read the blocking region data corresponding to the blocking region BI among the image data corresponding to the full image IM from the external memory 135 using the first addresses ISA and IEA and the second addresses BSA and BEA.

Figure 3:
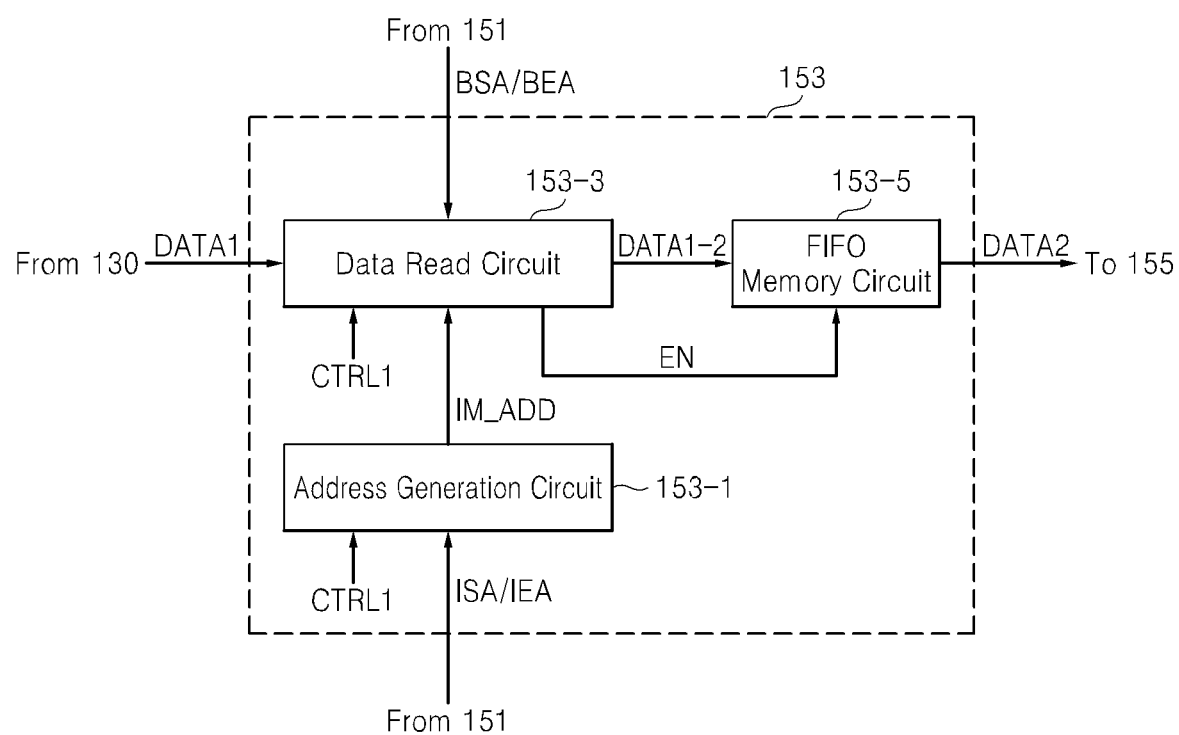
FIG. 3 is a block diagram of a data processing circuit illustrated in FIG. 1 according to an exemplary embodiment of the present general inventive concept.

FIG. 3 is a block diagram of the data processing circuit 153 illustrated in FIG. 1. Referring to FIGS. 1 through 3, the data processing circuit 153 may include an address generation circuit 153-1, a data read circuit 153-3, and a first-in, first-out (FIFO) memory circuit 153-5. The operation of each of the elements 153-1 and 153-3 may be controlled according to the control signal CTRL1 output from the SFR 151.

The address generation circuit 153-1 may generate full addresses IM_ADD corresponding to the image data of the full image IM using the first addresses ISA and IEA according to the control signal CTRL1. The address generation circuit 153-1 may output the full addresses IM_ADD to the data read circuit 153-3.

The data read circuit 153-3 may not read the blocking region data of the blocking region BI among the image data of the full image IM using the full addresses IM_ADD and the second addresses BSA and BEA according to the control signal CTRL1.

For instance, when a current address sequentially increasing line by line is a line start address of the blocking region BI, the data read circuit 153-3 may not read the blocking region data of the blocking region BI until the current address is an address subsequent to a line end address of the blocking region BI. In other words, the data read circuit 153-3 may stop the data read operation from the line start address of the blocking region BI to the line end address of the blocking region BI.

In another instance, when the current address sequentially increasing line by line is the line start address of the blocking region BI, the data read circuit 153-3 may execute a jump in the current address to the next address subsequent to the line end address of the blocking region BI. In other words, the data read circuit 153-3 may skip data from the line start address of the blocking region BI to the line end address of the blocking region BI.

According to the current embodiments, the data processing circuit 153 may read only the data DATA2, which corresponds to the remaining image RI excluding the blocking region BI in the full image IM, from the external memory 135 using the first addresses ISA and IEA and the second addresses BSA and BEA. The data processing circuit 153 does not read unnecessary data, i.e., the blocking region data, thereby reducing the waste of a data bandwidth. In addition, the data processing circuit 153 reads necessary data only, thereby reducing power consumed during the data read operation.

The data read operation of the data read circuit 153-3 will be described in detail with reference to FIGS. 4 through 6 later. The data read circuit 153-3 may output data read from the external memory 135 through the memory controller 130 to the FIFO memory circuit 153-5. The FIFO memory circuit 153-5 may receive output data DATA1-2 of the data read circuit 153-3 and may output the data DATA2 to the image processing circuit 155 in response to a data enable signal EN output from the data read circuit 153-3.

The image processing circuit 155 may perform image processing operations according to the control signal CTRL2. For instance, the image processing circuit 155 may perform operations such as color space conversion, blending, 3D merging, and image enhancement.

According to the control signal CTRL2, the image processing circuit 155 may receive the data DATA2 from the data processing circuit 153 and generate and output the processed data D_DATA to the display driver 190. For instance, the image processing circuit 155 may process the data DATA2 using one of the image processing operations and output the processed data D_DATA to the display driver 190.

The display driver 190 may process the data D_DATA output from the display controller 150 and output processed data to the display 195. The display 195 may receive the processed data from the display driver 190 and display the processed data.

The display 195 may be implemented, for example, by a touch screen, a liquid crystal display (LCD), a thin film transistor LCD (TIF-LCD), a light emitting diode (LED) display, an organic LED (OLED) display, an active-matrix OLED (AMOLED) display, or a flexible display.

Figure 4:
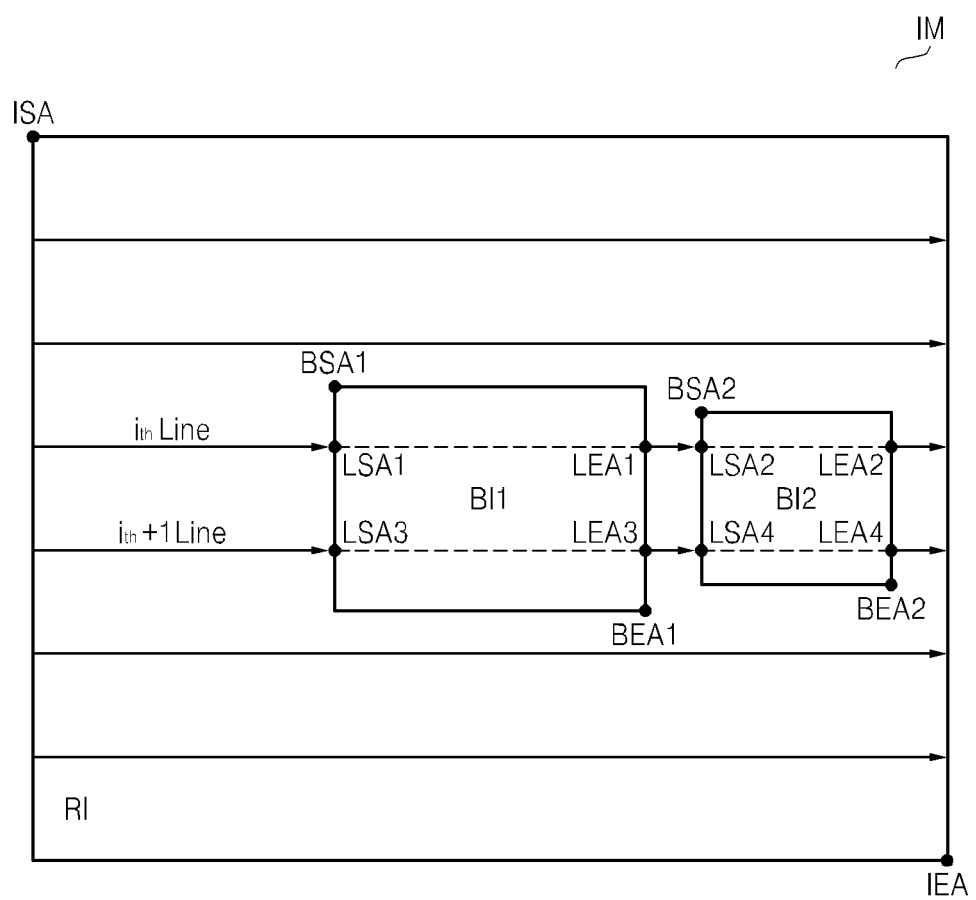
FIG. 4 is a conceptual diagram of a data read operation of a data read circuit illustrated in FIG. 3 according to an exemplary embodiment of the present general inventive concept.

FIG. 4 is a conceptual diagram of the data read operation of the data read circuit 153-3 illustrated in FIG. 3. To describe the data read operation of the data read circuit 153-3 in detail, FIG. 4 illustrates the full image IM including a plurality of blocking regions BI1 and BI2.

Referring to FIGS. 1, 3, and 4, the second addresses BSA and BEA output from the SFR 151 to the data read circuit 153-3 may include addresses BSA1, BEA1, BSA2, and BEA2 defining the blocking regions BI1 and BI2. The first blocking region BI1 may be defined by the third addresses BSA1 and BEA1.

The third addresses BSA1 and BEA1 may be the start address BSA1 and the end address BEA1, respectively, of blocking region data corresponding to the first blocking region BI1. The second blocking region BI2 may be defined by the fourth addresses BSA2 and BEA2. The fourth addresses BSA2 and BEA2 may be the start address BSA2 and the end address BEA2, respectively, of blocking region data corresponding to the second blocking region BI2.

The data read circuit 153-3 may compute line start addresses LSA1 through LSA4 and line end addresses LEA1 through LEA4 of the blocking regions BI1 and BI2 by using the addresses BSA1, BEA1, BSA2, and BEA2. For instance, the data read circuit 153-3 may compute the line start addresses LSA1 and LSA3 and the line end addresses LEA1 and LEA3 of the first blocking region BI1 using the third addresses BSA1 and BEA1.

The data read circuit 153-3 may also compute the line start addresses LSA2 and LSA4 and the line end addresses LEA2 and LEA4 of the second blocking region BI2 using the fourth addresses BSA2 and BEA2.

Although the line start addresses LSA1 through LSA4 and the line end addresses LEA1 through LEA4 are distinguished from the start addresses BSA1 and BSA2 and the end addresses BEA1 and BEA2 of the respective blocking region data of the respective blocking regions BI1 and BI2 in FIG. 4, the start addresses BSA1 and BSA2 and the end addresses BEA1 and BEA2 of the respective blocking regions BI1 and BI2 may be line start addresses and line end addresses, respectively, as well.

The data read circuit 153-3 may perform the data read operation, i.e., the operation of reading data corresponding to a current address according to the sequence of the full addresses IM_ADD. The current address may sequentially increase line by line. When the current address is any one of the line start addresses LSA1 through LSA4, the data read circuit 153-3 may not read the blocking region data of the blocking region BI1 or BI2 until the current address is an address subsequent to a corresponding one of the line end addresses LEA1 through LEA4.

While reading data corresponding to an $i_{th}$ line of the full image IM, the data read circuit 153-3 may stop the data read operation from a time when the current address is the line start address LSA1 until the current address is an address subsequent to the line end address LEA1. The data read circuit 153-3 may resume the data read operation at the address subsequent to the line end address LEA1 in the $i_{th}$ line.

While reading the data corresponding to the $i_{th}$ line of the full image IM, the data read circuit 153-3 may stop the data read operation from a time when the current address is the line start address LSA2 until the current address is an address subsequent to the line end address LEA2. The data read circuit 153-3 may resume the data read operation at the address subsequent to the line end address LEA2 in the $i_{th}$ line.

While reading data corresponding to an $i_{th}+1$ line of the full image IM, the data read circuit 153-3 may stop the data read operation from a time when the current address is the line start address LSA3 until the current address is an address subsequent to the line end address LEA3. The data read circuit 153-3 may resume the data read operation at the address subsequent to the line end address LEA3 in the $i_{th}+1$ line.

While reading the data corresponding to the $i_{th}+1$ line of the full image IM, the data read circuit 153-3 may stop the data read operation from a time when the current address is the line start address LSA4 until the current address is an address subsequent to the line end address LEA4. The data read circuit 153-3 may resume the data read operation at the address subsequent to the line end address LEA4 in the $i_{th}+1$ line.

Accordingly, the data read circuit 153-3 stops the data read operation from the line start addresses LSA1 and LSA3 of the first blocking region BI1 till the line end addresses LEA1 and LEA3 of the first blocking region BI1, and from the start addresses LSA2 and LSA4 of the second blocking region BI2 till the line end addresses LEA2 and LEA4 of the second blocking region BI1, thereby reading only data corresponding to the remaining image RI without reading data corresponding to the blocking regions BI1 and BI2 in the full image IM from the external memory 135 through the memory controller 130.

Alternatively, the data read circuit 153-3 may not read the blocking region data of the blocking regions BI1 and BI2 by making a jump in a current address from each of the line start addresses LSA1 through LSA4 to an address subsequent to a corresponding one of the line end addresses LEA1 through LEA4 when the current address is one of the line start addresses LSA1 through LSA4.

While reading the data corresponding to the $i_{th}$ line of the full image IM, the data read circuit 153-3 may make a jump in the current address to the address subsequent to the line end address LEA1 when the current address is the line start address LSA1. The data read circuit 153-3 may continue the data read operation by reading data corresponding to the address subsequent to the line end address LEA1 in the $i_{th}$ line.

While reading the data corresponding to the $i_{th}$ line of the full image IM, the data read circuit 153-3 may make a jump in the current address to the address subsequent to the line end address LEA2 when the current address is the line start address LSA2. The data read circuit 153-3 may continue the data read operation by reading data corresponding to the address subsequent to the line end address LEA2 in the $i_{th}$ line.

While reading the data corresponding to the $i_{th}+1$ line of the full image IM, the data read circuit 153-3 may make a jump in the current address to the address subsequent to the line end address LEA3 when the current address is the line start address LSA3. The data read circuit 153-3 may continue the data read operation by reading data corresponding to the address subsequent to the line end address LEA3 in the $i_{th}+1$ line.

While reading the data corresponding to the $i_{th}+1$ line of the full image IM, the data read circuit 153-3 may make a jump in the current address to the address subsequent to the line end address LEA4 when the current address is the line start address LSA4. The data read circuit 153-3 may continue the data read operation by reading data corresponding to the address subsequent to the line end address LEA4 in the $i_{th}+1$ line.

Accordingly, the data read circuit 153-3 skips or jumps data from each of the line start addresses LSA1 through LSA4 of the blocking regions BI1 and BI2 to a corresponding one of the line end addresses LEA1 through LEA4, thereby reading only data corresponding to the remaining image RI without reading data corresponding to the blocking regions BI1 and BI2 in the full image IM from the external memory 135 through the memory controller 130.

Figure 5:
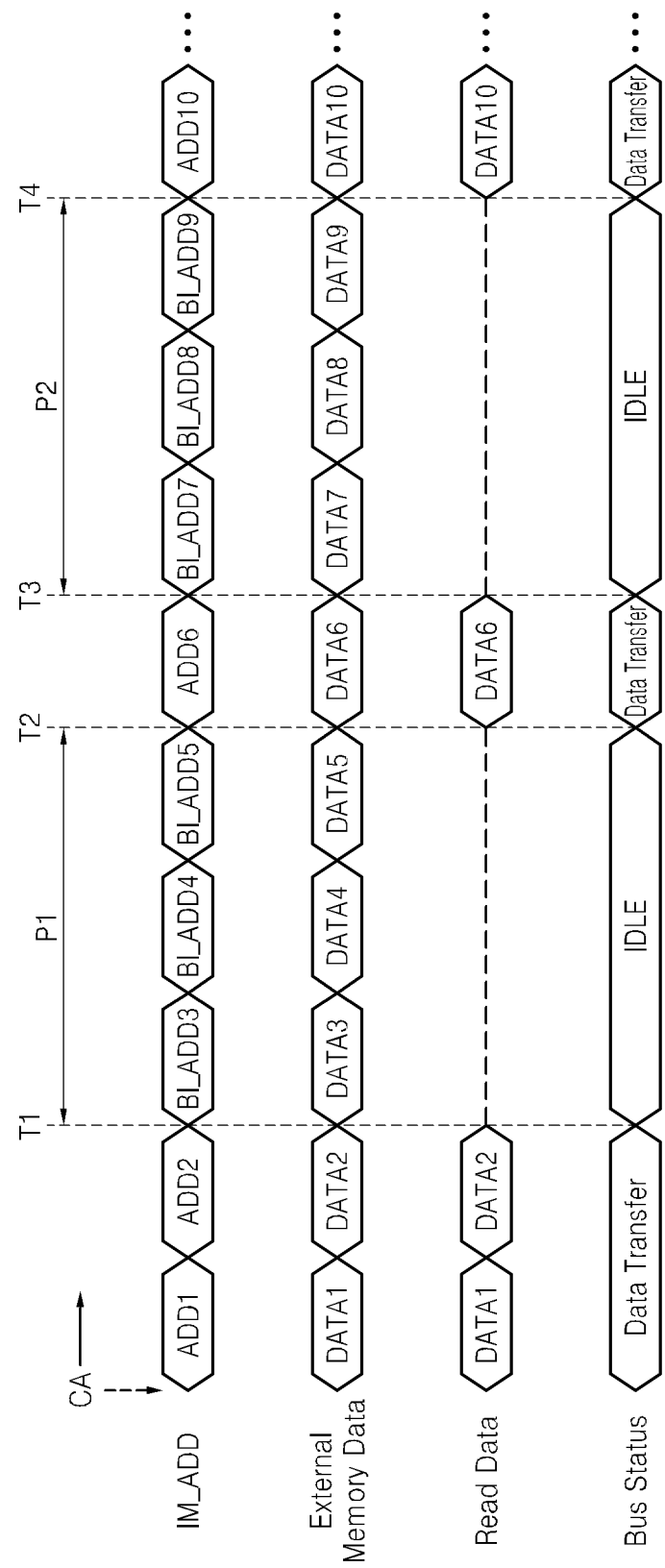
FIG. 5 is a timing chart showing a method of reading data according to an exemplary embodiment of the present general inventive concept.

FIG. 5 is a timing chart showing a method of reading data according to some embodiments of the inventive concept. Here, it is assumed that the data read circuit 153-3 reads data only corresponding to the $i_{th}$ line in the full image IM illustrated in FIG. 4.

Referring to FIGS. 1 and 3 through 5, when a current address CA is any one of the line start addresses LSA1 through LSA4, the data read circuit 153-3 may not read the blocking region data of the blocking region BI1 or BI2 until the current address CA becomes the address subsequent to a corresponding one of the line end addresses LEA1 through LEA4.

The data read circuit 153-3 may perform a data read operation, i.e., an operation of reading data corresponding to the current address CA according to the sequence of the full address IM ADD. When the current address CA is the line start address LSA1 (=BI_ADD3) of the first blocking region BI1 in the $i_{th}$ line at a first time point T1, the data read circuit 153-3 stops the data read operation during a first period P1. In other words, the data read circuit 153-3 may not read data DATA3 through DATA5 respectively corresponding to the addresses BI_ADD3 through BI_ADD5.

When the current address CA is an address ADD6 subsequent to the line end address LEA1 (=BI_ADD5) of the first blocking region BI1 in the $i_{th}$ line at a second time point T2, the data read circuit 153-3 resumes the data read operation at the second time point T2. In other words, the data read circuit 153-3 may read data DATA6 corresponding to the current address CA (=ADD6) at the second time point T2.

When the current address CA is the line start address LSA2 (=BI_ADD7) of the second blocking region BI2 in the $i_{th}$ line at a third time point T3, the data read circuit 153-3 stops the data read operation during a second period P2. In other words, the data read circuit 153-3 may not read data DATA7 through DATA9 respectively corresponding to the addresses BI_ADD7 through BI_ADD9.

When the current address CA is an address ADD10 subsequent to the line end address LEA2 (=BI_ADD9) of the second blocking region BI2 in the $i_{th}$ line at a fourth time point T4, the data read circuit 153-3 resumes the data read operation at the fourth time point T4. In other words, the data read circuit 153-3 may read data DATA10 corresponding to the current address CA (=ADD10) at the fourth time point T4.

Consequently, the data read circuit 153-3 may stop the data read operation during the first and second periods P1 and P2.

Figure 6:
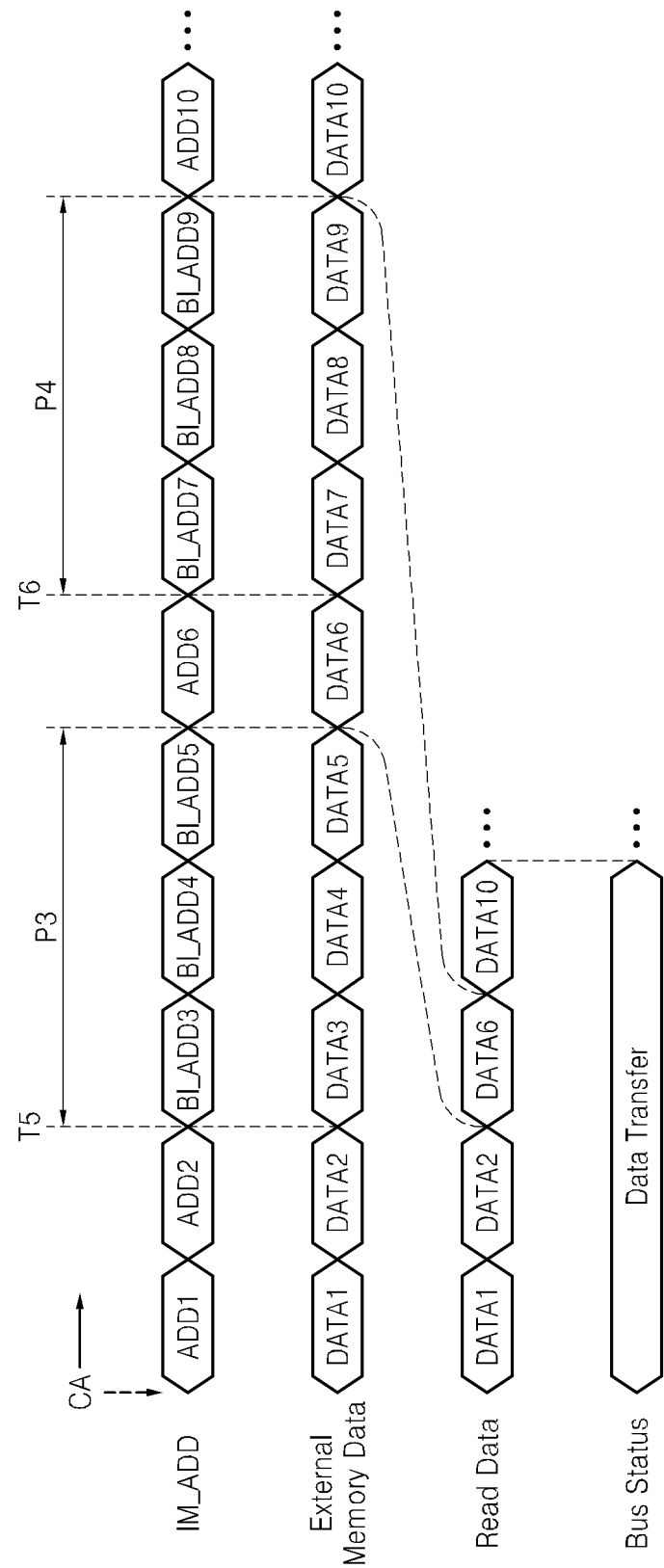
FIG. 6 is a timing chart showing a method of reading data according to an exemplary embodiment of the present general inventive concept.

FIG. 6 is a timing chart showing a method of reading data according to other embodiments of the inventive concept. Here, it is assumed that the data read circuit 153-3 reads data only corresponding to the $i_{th}$ line in the full image IM illustrated in FIG. 4.

Referring to FIGS. 1, 3, 4, and 6, when the current address CA is any one of the line start addresses LSA1 through LSA4, the data read circuit 153-3 may not read the blocking region data of the blocking region BI1 or BI2 by instead making a jump in the current address CA to the address subsequent to the corresponding one of the line end addresses LEA1 through LEA4.

The data read circuit 153-3 may perform the data read operation, i.e., the operation of reading data corresponding to the current address CA according to the sequence of the full address IM_ADD. When the current address CA is the line start address LSA1 (=BI_ADD3) of the first blocking region BI1 in the $i_{th}$ line at a fifth time point T5, the data read circuit 153-3 may make a jump in the current address CA to the address ADD6 subsequent to the line end address LEA1 (=BI_ADD5). In other words, the data read circuit 153-3 may skip the addresses BI_ADD3 through BI_ADD5 in a third period P3 and continuously read the data DATA6 corresponding to the address ADD6 subsequent to the line end address LEA1 (=BI_ADD5).

When the current address CA is the line start address LSA2 (=BI_ADD7) of the second blocking region BI2 in the $i_{th}$ line at a sixth time point T6, the data read circuit 153-3 may make a jump in the current address CA to the address ADD10 subsequent to the line end address LEA2 (=BI_ADD9). In other words, the data read circuit 153-3 may skip the addresses BI_ADD7 through BI_ADD9 in a fourth period P4 and continuously read the data DATA10 corresponding to the address ADD10 subsequent to the line end address LEA2 (=BI_ADD9).

In the embodiments illustrated in FIGS. 5 and 6, a DRAM performing a burst read is considered. However, when a memory capable of data masking during a data read operation is used, the data masking may be used during the data read operation of the external memory 135 using information stored in the SFR 151 of the display controller 150 so that data read from the external memory 135 is bypassed without toggling. As a result, additional reduction of power consumption can be accomplished.

Figure 7:
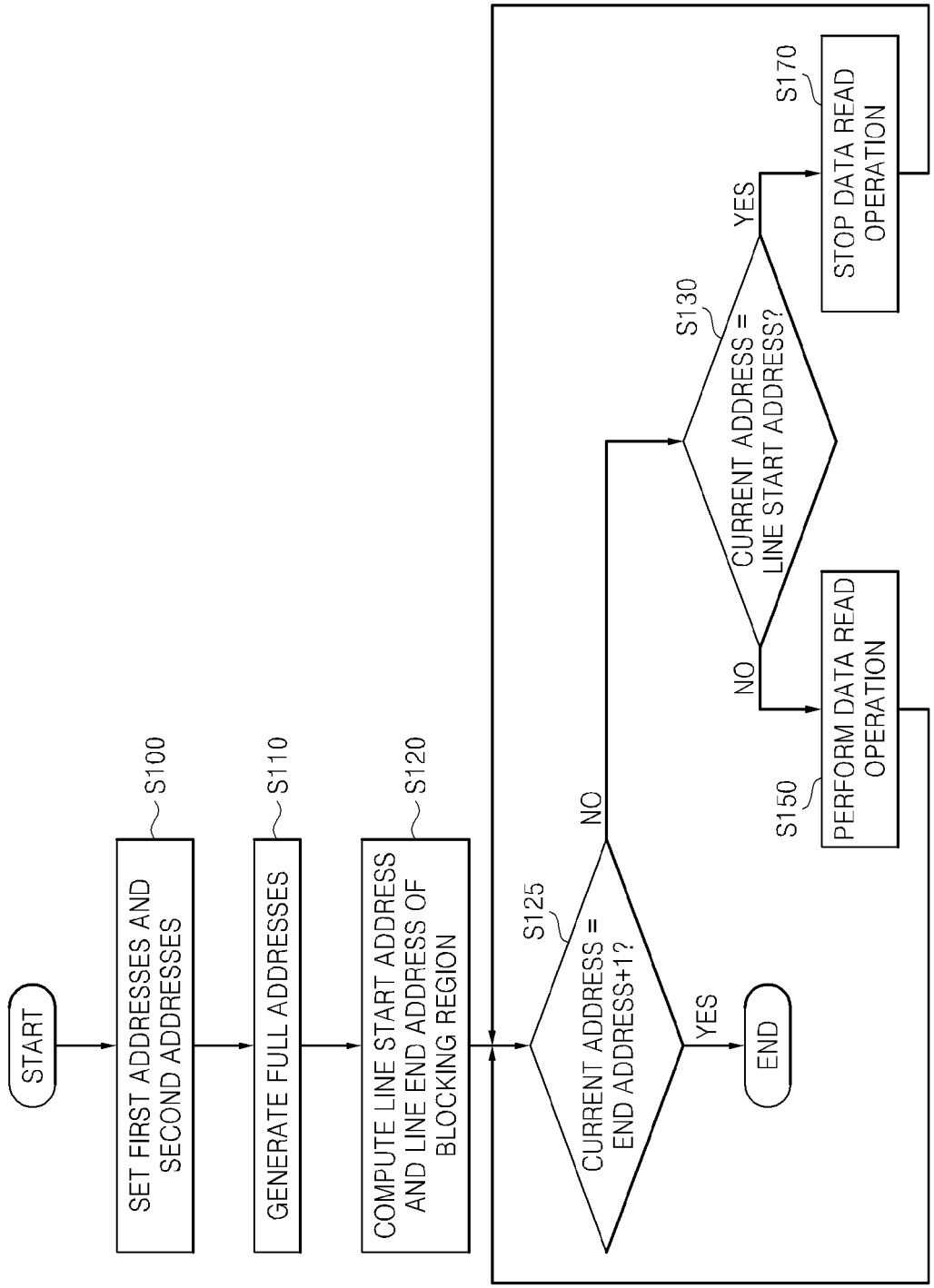
FIG. 7 is a flowchart of a method of operating an image data processor according to an exemplary embodiment of the present general inventive concept.

FIG. 7 is a flowchart of a method of operating the image data processor 100 according to some embodiments of the general inventive concept. Referring to FIGS. 1, 2, 3, and 7, the CPU 110 may set the first addresses ISA and IEA and the second addresses BSA and BEA through the SFR 151 in operation S100.

The address generation circuit 153-1 may generate the full addresses IM_ADD corresponding to the image data of the full image IM using the first addresses ISA and IEA according to the control signal CTRL1 in operation S110. The data read circuit 153-3 may compute a line start address and a line end address of the blocking region BI using the second addresses BSA and BEA in operation S120.

When a current address sequentially increasing line by line is an address subsequent to the end address IEA of the full image IM in operation S125, the data read circuit 153-3 may terminate the data read operation. When the current address is not the address subsequent to the end address IEA of the full image IM in operation S125, that is, when the current address is any one of the full addresses IM_ADD from the start address ISA to the end address IEA of the full image IM, the data read circuit 153-3 may compare or determine whether the current address is the same as the line start address of the blocking region BI in operation S130.

When the current address is not the same as the line start address of the blocking region BI in operation S130, the data read circuit 153-3 may perform the data read operation in which data corresponding to the current address is read in operation S150. When the current address is the same as the line start address of the blocking region BI in operation S130, the data read circuit 153-3 may stop the data read operation until the current address becomes an address subsequent to the line end address of the blocking region BI in operation S170.

Figure 8:
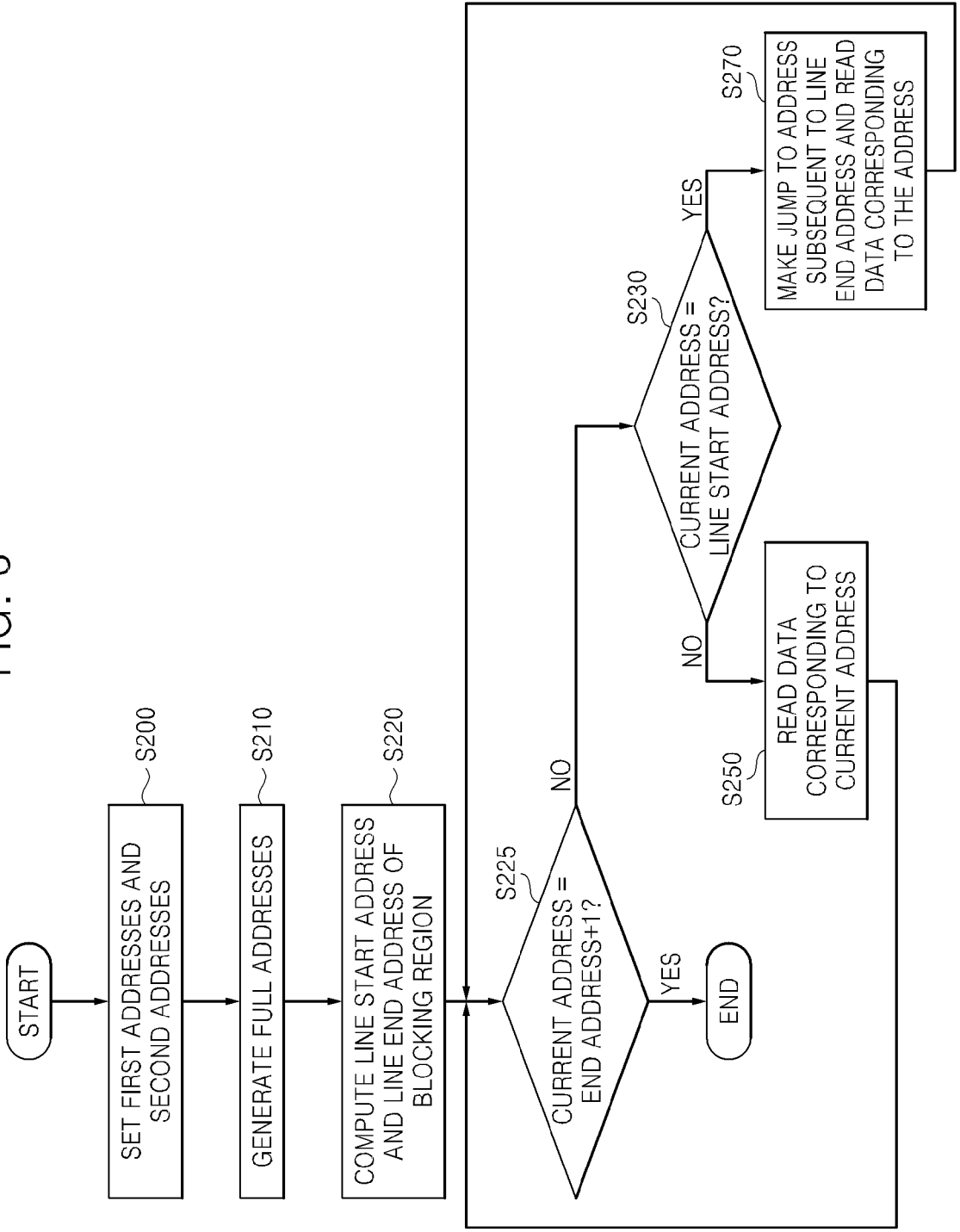
FIG. 8 is a flowchart of a method of operating an image data processor according to an exemplary embodiment of the present general inventive concept.

FIG. 8 is a flowchart of a method of operating the image data processor 100 according to other embodiments of the inventive concept.

Referring to FIGS. 1, 2, 3, and 8, the CPU 110 may set the first addresses ISA and IEA and the second addresses BSA and BEA through the SFR 151 in operation S200. The address generation circuit 153-1 may generate the full addresses IM_ADD corresponding to the image data of the full image IM using the first addresses ISA and IEA according to the control signal CTRL1 in operation S210.

The data read circuit 153-3 may compute a line start address and a line end address of the blocking region BI using the second addresses BSA and BEA in operation S220. When a current address sequentially increasing line by line is an address subsequent to the end address IEA of the full image IM in operation S225, the data read circuit 153-3 may terminate the data read operation.

When the current address is not the address subsequent to the end address IEA of the full image IM in operation S225, that is, when the current address is any one of the full addresses IM_ADD from the start address ISA to the end address IEA of the full image IM, the data read circuit 153-3 may compare or determine whether the current address is the same as the line start address of the blocking region BI in operation S230.

When the current address is not the same as the line start address of the blocking region BI in operation S230, the data read circuit 153-3 may read data corresponding to the current address in operation S250.

When the current address is the same as the line start address of the blocking region BI in operation S230, the data read circuit 153-3 may make a jump in the current address to an address subsequent to the line end address of the blocking region BI and continuously read data corresponding to the address subsequent to the line end address in operation S270.

Figure 9:
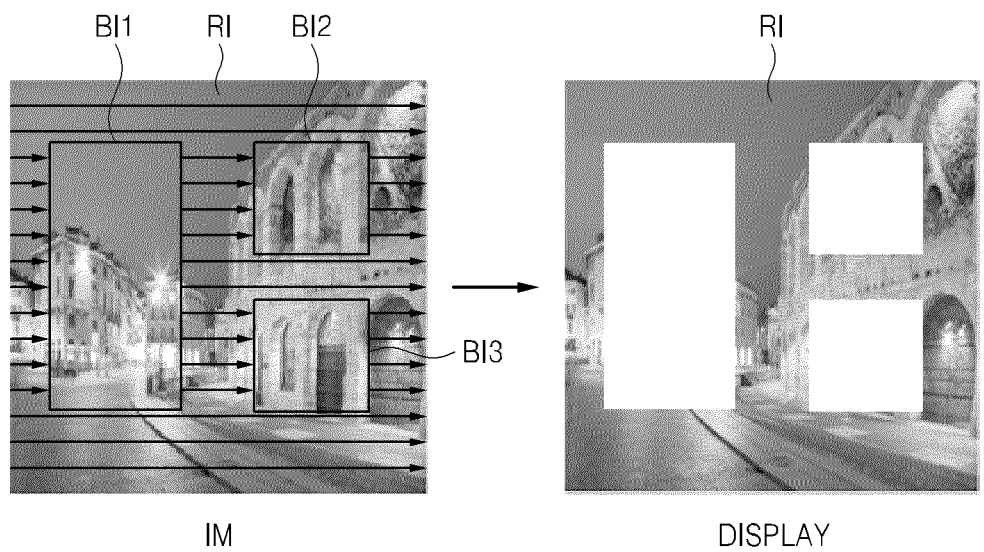
FIG. 9 is a diagram showing a display image in which data read using a data read method according to an exemplary embodiment of the present general inventive concept is displayed.

FIG. 9 is a diagram showing a display image in which data read using a data read method according to some embodiments of the inventive concept is displayed.

Referring to FIGS. 1, 3, and 9, the image data processor 100 may read only data corresponding to the remaining image RI excluding blocking regions BI1, BI2, and BI3 in the full image IM, process the data, and transmit the processed D_DATA to the display 195 through the display driver 190. The display image in which the processed data D_DATA is displayed on the display 195 is illustrated in FIG. 9. Only the remaining image RI excluding the blocking regions BI1, BI2, and BI3 in the full image IM may be displayed on the display 195.

Figure 10:
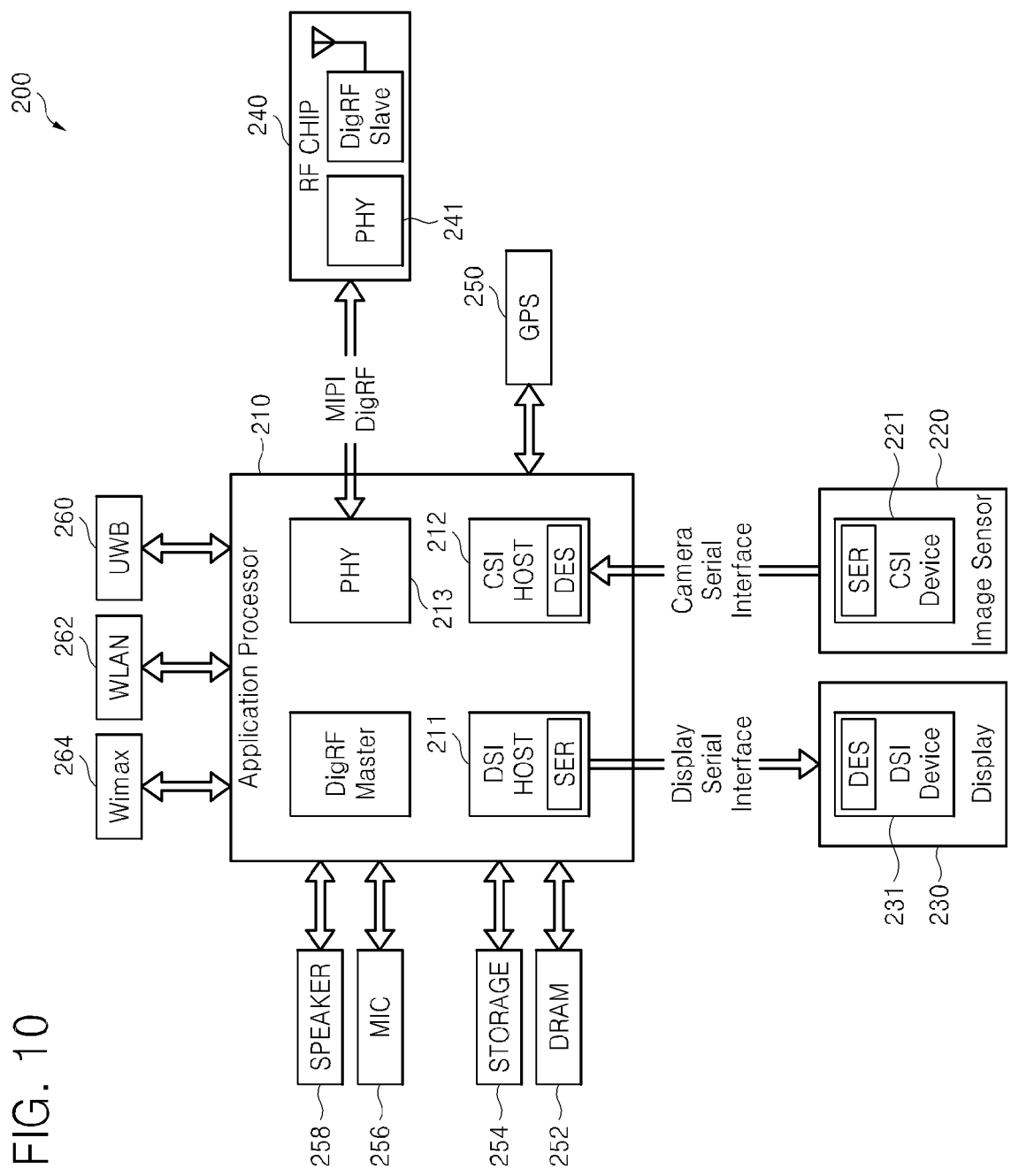
FIG. 10 is a block diagram of an image data processing system according an exemplary embodiment of the present general inventive concept.

FIG. 10 is a block diagram of an image data processing system 200 according to other embodiments of the inventive concept. Referring to FIG. 10, the image data processing system 200 may be implemented as an apparatus, such as, for example, a mobile phone, a smart phone, or a tablet PC, which can use or support mobile industry processor interface (MIPI®).

The image data processing system 200 includes an application processor 210, an image sensor 220, and a display 230. The application processor 210 may include the display controller 150 illustrated in FIG. 1.

A camera serial interface (CSI) host 212 implemented in the application processor 210 may perform serial communication with a CSI device 221 included in the image sensor 220 through CSI. A deserializer DES and a serializer SER may be implemented in the CSI host 212 and the CSI device 221, respectively.

A display serial interface (DSI) host 211 implemented in the application processor 210 may perform serial communication with a DSI device 231 included in the display 230 through DSI. A serializer SER and a deserializer DES may be implemented in the DSI host 211 and the DSI device 231, respectively.

The image data processing system 200 may also include a radio frequency (RF) chip 240 communicating with the application processor 210. A physical layer (PHY) 213 of the application processor 210 and a PHY 241 of the RF chip 240 may communicate data with each other according to MIPI DigRF.

The image data processing system 200 may further include a global positioning system (GPS) receiver 250, a volatile memory 252 such as DRAM, a data storage device 254 including non-volatile memory such as NAND flash memory, a microphone (MIC) 256, and/or a speaker 258.

The application processor 210 may communicate with external devices using at least one communication protocol or standard such as, for example, ultra-wideband (UWB) 260, wireless local area network (WLAN) 262, worldwide interoperability for microwave access (WiMAX) 264, or long term evolution (LTE™). The DSI host 211 may function as the display controller 150 illustrated in FIG. 1.

As described above, according to some embodiments of the inventive concept, an apparatus bypasses reading blocking region data corresponding to a blocking region among image data corresponding to a full image using addresses defining the full image and addresses defining the blocking region included in the full image and reads only data corresponding to the remaining image excluding the blocking region in the full image to display the remaining image, thereby reducing power consumption during a data read operation. Although the blocking region has been illustrated in a rectangular shape it is understood that this is merely exemplary and a blocking region of any shape or complexity may be designated.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of selectively reading data, the method comprising:
    setting, by a central processing unit (CPU), first addresses defining a full image and second addresses defining a blocking region comprised in the full image using a special function register; and
    bypassing, by a data processing circuit, reading blocking region data corresponding to the blocking region when reading image data corresponding to the full image using the first addresses and the second addresses according to a control signal output from the special function register,
    wherein the bypassing of the reading blocking region data comprises, based on a current address sequentially increasing line by line being a line start address of the blocking region, not reading the blocking region data until the current address becomes an address subsequent to a line end address of the blocking region.

2. A system on chip comprising:
    a special function register configured to store first addresses defining a full image and second addresses defining a blocking region comprised in the full image; and
    a data processing circuit configured to bypass reading blocking region data corresponding to the blocking region when reading image data corresponding to the full image using the first addresses and the second addresses, wherein the data processing circuit comprises:
- an address generation circuit configured to generate full addresses corresponding to the image data using the first addresses; and
- a data read circuit configured to receive the full addresses from the address qeneration circuit, to perform a read operation of the image data, and to bypass the reading of the blocking region data based on a control signal from the special function register to bypass the reading of the blocking region.

3. The system on chip of claim 2, wherein the data read circuit configured to compute a line start address and a line end address of the blocking region in each line using the second addresses and, when a current address increasing sequentially is the line start address among the full addresses, bypass reading the blocking region data until the current address becomes an address subsequent to the line end address.

4. The system on chip of claim 2, wherein the data read circuit is configured to compute a line start address and a line end address of the blocking region in each line using the second addresses and, when a current address increasing sequentially is the line start address among the full addresses, to make a jump in the current address to an address subsequent to the line end address based on the control signal from the special function register.

5. An application processor comprising the system on chip of claim 2.

6. The application processor of claim 5, wherein the data read circuit is configured to compute a line start address and a line end address of the blocking region in each line using the second addresses and, when a current address increasing sequentially is the line start address among the full addresses, to bypass reading the blocking region data until the current address becomes an address subsequent to the line end address.

7. The application processor of claim 5, wherein the data read circuit is configured to compute a line start address and a line end address of the blocking region using the second addresses and, when a current address increasing sequentially is the line start address among the full addresses, to make a jump in the current address to an address subsequent to the line end address based on the control signal from the special function register.

8. A mobile apparatus comprising:
- a memory configured to store a full image; and
- the system on chip of claim 2.

9. The mobile apparatus of claim 8, wherein when a current address sequentially increasing line by line is a line start address of the blocking region, the system on chip bypasses reading the blocking region data until the current address becomes an address subsequent to a line end address of the blocking region.

10. The mobile apparatus of claim 8, wherein when a current address sequentially increasing line by line is a line start address of the blocking region, the system on chip makes a jump in the current address to an address subsequent to a line end address of the blocking region.

11. The mobile apparatus of claim 8, further comprising:
- a non-volatile memory configured to store an application; and
- a central processing unit configured to execute the application, wherein the application controls the number of blocking regions and the second addresses.

12. An image data processor, comprising:
- a register configured to store first start/end addresses corresponding to an image in stored data and second start/end addresses corresponding to one or more regions included in the image; and
- a data processing circuit configured to read image data of the image based on the first start/end addresses exclusive of the one or more regions based on the second start/end addresses, wherein the data processing circuit comprises:
- an address generation circuit configured to generate addresses corresponding to the image based on the first start/end addresses and to sequentially output the addresses; and
- a data read circuit configured to receive the addresses from the address generation circuit and to bypass the reading of the blocking region data based on a control signal from the register to bypass the reading of the blocking region.

13. The image data processor of claim 12, wherein the data read circuit is configured to selectively read image data from among the generated addresses exclusive of data within the one or more regions based on the second start/end addresses.

* * * * *